US00RE34636E

United States Patent [19]

Bivens

[11] E Patent Number: Re. 34,636

[45] Reissued Date of Patent: Jun. 14, 1994

[54] APPARATUS FOR FILTERING LIQUIDS

[76] Inventor: Thomas H. Bivens, 6907 FM 1488, P.O. Box 1250, Magnolia, Tex. 77355-1250

[21] Appl. No.: 813,970

[22] Filed: Dec. 24, 1991

Related U.S. Patent Documents

Reissue of:

[64] Patent No.: 4,805,525
Issued: Feb. 21, 1989
Appl. No.: 56,402
Filed: May 29, 1987

[51] Int. Cl.[5] ..... A47J 37/12

[52] U.S. Cl. ..... 99/408; 210/167; 210/232; 210/461; 210/DIG. 8

[58] Field of Search ..... 99/408, 409, 403, 407; 210/DIG. 8, 167, 232, 461, 486

[56] References Cited

U.S. PATENT DOCUMENTS

| | | | |
|---|---|---|---|
| 445,223 | 1/1891 | Knight | 210/486 |
| 2,359,368 | 10/1944 | Klopfenstein | 210/461 |
| 2,424,211 | 7/1947 | Webb | 210/461 |
| 2,610,740 | 9/1952 | Hunter | 99/408 |
| 2,635,527 | 4/1953 | Overbeck et al. . | |
| 2,760,641 | 8/1956 | Mies et al. . | |
| 3,147,220 | 9/1964 | Avery | 210/DIG. 8 |
| 3,159,095 | 12/1964 | Wagner | 99/408 |
| 3,263,818 | 8/1966 | Gedrich . | |
| 3,279,605 | 10/1966 | Shepherd . | |
| 3,667,374 | 6/1972 | Holman | 99/408 |
| 3,735,871 | 5/1973 | Bisko | 210/167 |
| 4,113,623 | 9/1978 | Koether et al. | 210/167 |
| 4,328,097 | 5/1982 | Whaley et al. | 99/408 |
| 4,591,434 | 5/1986 | Prudhomme | 99/408 |
| 4,604,203 | 8/1986 | Kyle | 210/489 |

OTHER PUBLICATIONS

"New! Permafil Oil Filters"; Filtration International, Inc. Houston, Texas; date unknown.

"Permafil" Brochure; Edible Oil Division, Houston Texas; date unknown.

The Filter Magic® System by Frymaster Wellbilt Company Bulletin No. 818-001 Rev. Nov. 1986 date unknown.

ReNu Brochure, ReNu Vacuum Filter Manufacturing Company, date unknown.

R. F. Hunter Co., Inc. Brocuure, date unknown.

Robot Coupe U.S.A. Inc. Brochure, date unknown.

Castle, Filter Brochure, The Prince Castle Company, date unknown.

Fastfilter® Assembly and Operating Instructions, date unknown.

*Primary Examiner*—Timothy F. Simone
*Attorney, Agent, or Firm*—Keeling & Associates

[57] ABSTRACT

Apparatus for filtering contaminants from liquids such as cooking oil is disclosed. A filter assembly comprises an envelope formed of an upper wire mesh filter element and a lower wire mesh filter element joined about their peripheral edges and a porous insert filter member removably contained centrally within the envelope which has a plurality of voids allowing vertical and lateral fluid flow therethrough. The filter assembly is releasably secured in the assembled condition by a fastener which is adapted to be connected to a pump and the fastener has fluid passageways in communication with *the lateral flow passages in* the porous insert for drawing fluid through the upper and lower filter elements and said insert. The upper and lower filter elements of the envelope are formed of stainless steel mesh and the porous insert filter member is formed of apertured aluminum plate. The filter assembly is suited for use in combination with food cooking apparatus employing cooking oil disposed in a container in which food particles and other particulate matter become deposited and may be used in place of conventional cooking oil filter apparatus. The apparatus is also suitable for use in systems employing a filter powder disbursed in the cooking oil to be filtered.

9 Claims, 1 Drawing Sheet

APPARATUS FOR FILTERING LIQUIDS

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

The present invention relates generally to filtering apparatus, and more particularly to a filter assembly for the effective filtration of liquids such as cooking oil without the requirement of filter paper or other disposable filter elements.

BRIEF DESCRIPTION OF THE PRIOR ART

Cooking oil is extensively used in the food industry to cook various comestibles. Animal fat or other suitable material may sometimes be used as the cooking material in lieu of cooking oil. The term "cooking oil" is used herein to designate any such material. Frying is frequently accomplished in relatively deep containers with the comestible to be cooked immersed in the cooking oil. In cases where quantities of food are regularly cooked in such a manner, the cooking oil becomes contaminated with various particles of food or other impurities, and charred food particles produce an odor which adversely affects the taste of foods cooked therein. Clean cooking oil further provides relatively efficient utilization of energy in the cooking process.

Wire mesh strainers have been long known and used to remove particulate matter from cooking oil. Strainers have not been effective, however, to remove sufficient particulate matter to provide particulate-free cooking oil, and have been demonstrated to only slightly prolong the usefulness of the cooking oil.

To beneficially control free fatty acids in the cooking oil, suspended particles of the size of two (2) microns and larger should be removed from the cooking oil.

As presently commercially practiced, cooking oil is cleaned by pumping it through a filter assembly containing filter paper or other disposable filter element. A filter powder is normally applied to the filter element by dispersal in the cooking oil being cleaned to precipitate particulates and to control odor. Filter powders commonly consist of diatomaceous earth or pearlite; however, some consist of chemical mixtures.

A principal disadvantage of the presently practiced methods of filtering is the requirement of paper or other disposable filter element. In restaurants with high volumes of food processing, paper filters are commonly changed four to six times per day. Disposable filter elements require the time and expense of disassembly of the filter assembly from time to time to replace the filter element, and require the expense of the disposable filters.

Additionally, disposable filters tend to be easily damaged. Tears or other voids in filters may result in particulate matter and filter powder flowing through the pump with consequent reduced pump life and efficiency, filter powder accumulation on heating elements, and filter powder contamination of the cooking oil.

Kyle, U.S. Pat. No. 4,604,203 discloses a cooking oil filtering apparatus and filter therefor involving a layered filter formed of a porous web of microfibers and supported by a material more porous than the microfiber web. The filter material disclosed is not purported to be a permanent material thus replacement is required from time to time.

Bisko, U.S. Pat. No. 3,735,871 discloses a cloth filter jacket for a cooking oil filtering apparatus, the purported purpose of which is to provide a jacket which enables cleaning of the filter assembly by scraping, thus prolonging the time periods between disassembly of the filter apparatus and replacement of the disposable filter element.

Shepherd, U.S. Pat. No. 3,279,605 discloses a filter assembly providing for pumping of the cooking oil through the filter assembly, which filter assembly includes a disposable filter medium.

Gedrich, U.S. Pat. No. 3,263,818 discloses a cooking oil filtering apparatus providing pumping of the filtered cooking oil to its original, or other, container. The filter assembly disclosed includes a disposable filter element.

Miles, et al, U.S. Pat. No. 2,760,641 discloses a portable filtering apparatus providing pumping of the cooking oil through the filter assembly, which filter assembly includes a disposable filter element.

Overbeck, U.S. Pat. No. 2,635,527 discloses a deep frying strainer to be located at the bottom of the cooking oil container to strain food particles from cooking oil as the strainer is lifted from the container and the liquid is forced through the strainer by the action of gravity. Although beneficial to remove much particulate matter, the invention disclosed does not effectively remove smaller particulate contaminants.

*A sales brochure (undated, but known to have been published in 1985) by Filtration International, Inc., entitled "New! Permafil Oil Filters Eliminates Filter Papers" (Model FIP-110), discloses a stainless steel filter similar in some respects but dissimilar in others to the present invention. Photographs of this filter and a more complete description are set forth in an accompanying prior art statement.*

The inventions disclosed and the current known practice of filtering cooking oil indicate that paper filters or other disposable filters are required to remove sufficient small particulate matter to provide for continued re-use of cooking oil required in commercial cooking applications. Disadvantages of disposable filters include the cost of the filters and the time and expense involved in the disassembly of the filter assembly and replacement of the filters.

The present invention is distinguished over the prior art in general, and these patents *and the Filtration International Brochure,* in particular *by* a filter apparatus comprising an envelope formed of an upper wire mesh filter element and a lower wire mesh filter element joined about their peripheral edges and a porous insert filter member removably contained centrally within the envelope which has a plurality of voids allowing vertical and lateral fluid flow therethrough. The filter assembly is releasably secured in the assembled condition by a fastener which is adapted to be connected to a pump and the fastener has fluid passageways in communication with *the laterally extending passages in* the porous insert for drawing fluid through the upper and lower filter elements and said insert. The upper and lower filter elements of the envelope are formed of stainless steel mesh and the porous insert filter member is formed of apertured aluminum plate.

SUMMARY OF THE INVENTION

It is therefore an object of the present invention to provide a filtering apparatus that effectively removes particulate matter from cooking oil without the necessity of regular replacement of the filter element.

It is another object of the present invention to provide a filter assembly incorporating a permanent filter element to provide for relatively efficient and economical filtering of cooking oil.

It is another object of the present invention to provide a filter assembly incorporating a permanent filter element that can be readily adapted to replace existing filter assemblies in a variety of applications.

It is another object of this invention to provide a filter assembly resistant to damage.

It is a further object of this invention to provide a filter element that can be readily repaired.

It is a further object of the present invention to provide a method of filtering particulate matter from cooking oil without the use of disposable filters.

Other objects of the invention will become apparent from time to time throughout the specification and claims as hereinafter related.

The above noted objects and other objects of the invention are accomplished by the present apparatus for filtering contaminants from liquids which includes a filter assembly comprising an envelope formed of an upper wire mesh filter element and a lower wire mesh filter element joined about their peripheral edges and a porous insert filter member removably contained centrally within the envelope which has a plurality of voids allowing vertical and lateral fluid flow therethrough. The filter assembly is releasably secured in the assembled condition by a fastener which is adapted to be connected to a pump and the fastener has fluid passageways in communication with *the lateral flow passages in* the porous insert for drawing fluid through the upper and lower filter elements and said insert. The upper and lower filter elements of the envelope are formed of stainless steel mesh and the porous insert filter member is formed of apertured *slitted* aluminum plate.

DESCRIPTION OF THE PREFERRED EMBODIMENT

Figure 1:
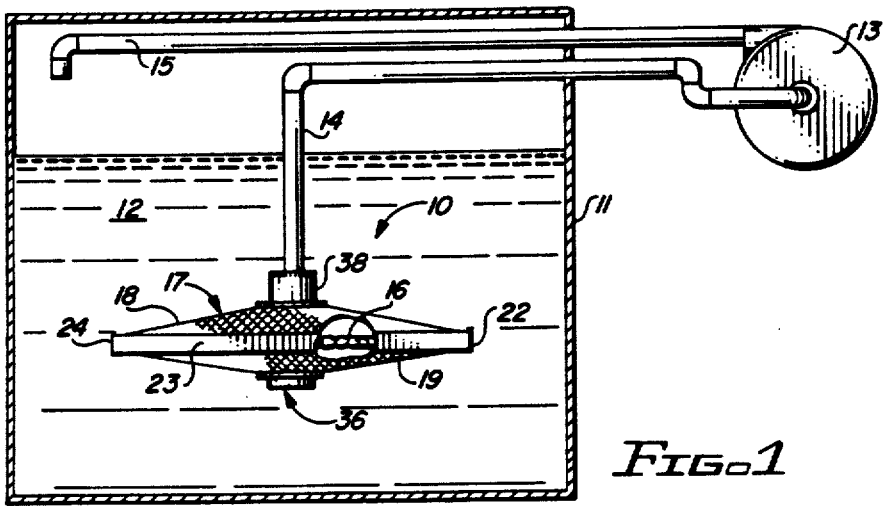
FIG. 1 is a cross sectional view of the filtering apparatus in accordance with the present invention being employed to filter cooking oil.

Referring to the drawings by numerals of reference, there is shown schematically in FIG. 1, apparatus for filtering cooking oil. The apparatus comprises a filter assembly 10 installed in a container 11 containing a quantity of cooking oil 12, a delivery tube 14 connecting the filter assembly 10 to a pump 13, and a pump outlet tube 15 providing for transmission of fluid from the pump 13 to the container 11 or other desired destination. The pump is schematically shown as it may be of any appropriate conventional design.

Figure 2:
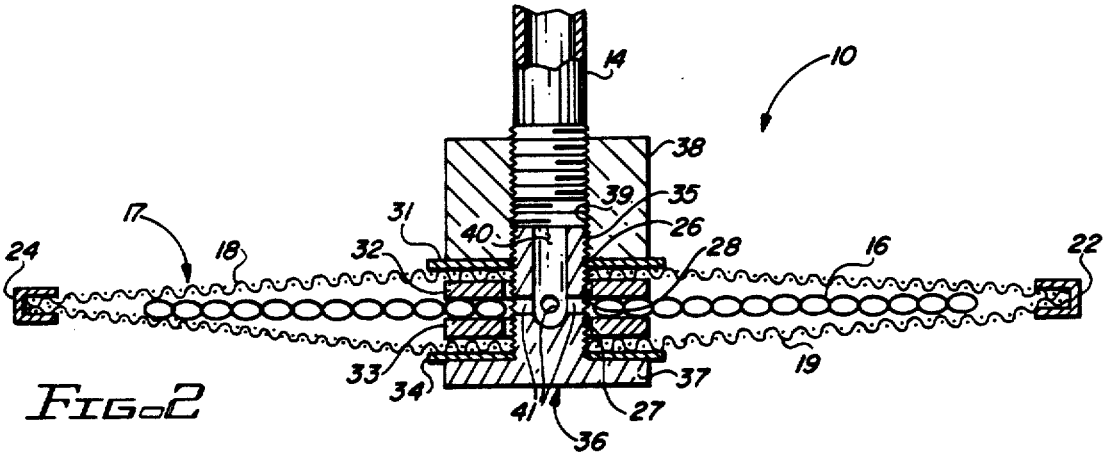
FIG. 2 is a cross sectional view schematically illustrating the filter assembly of the present invention.
Figure 3:
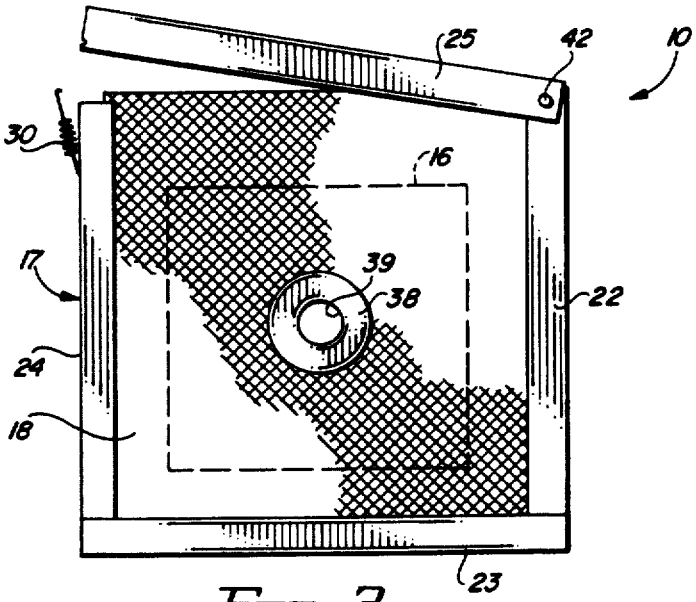
FIG. 3 is a top plan view of the filter assembly of the present invention.

As shown in FIGS. 2 and 3, the filter assembly 10 comprises a generally flat filter insert member 16 of square or rectangular configuration enclosed centrally within a wire mesh envelope 17. The envelope 17 is formed of an upper wire mesh filter element 18 and a lower wire mesh filter element 19 of equal size. The filter elements 18 and 19 are of sufficient length and width to extend beyond the edges of the insert member 16.

Filter insert 16 is formed of relatively rigid metallic material, such as aluminum, and contains sufficient voids to allow the free flow of fluids therethrough *both vertically and laterally*. The insert surface area is sufficient to support the relatively flexible mesh of the upper filter element 18 and the lower filter element 19. The filter insert 16 is preferrably constructed of deformable material (such as aluminum) so that it may be deformed to conform with the contour of cooking oil containers having rounded bottoms. Such deformity allows cooking oil to be circulated from the lower recesses of such containers. Aluminum plate having a tubular slit grid has been proven to be a material which is suitably plastic and suitably rigid at temperatures incurred in cooking oil applications and also provides *passages for* a vertical and lateral fluid path.

Upper filter element 18 and lower filter element 19 may be formed of flexibly rigid and durable wire mesh, such as stainless steel. A strand mesh configuration is preferred because it is more suitable for use with comestibles. Wire mesh of the following warp and fill (expressed in strands per inch) and with the indicated respective diameters have been determined to be suitable:

- 24×110 stainless steel wire mesh with 0.0145 inch and 0.90 inch strand diameters respectively;
- 80×70 stainless steel wire mesh with strand diameter of 0.0055 inches; and
- 100 stainless steel wire mesh with strand diameter of 0.0045 inches.

It should be understood that other combinations of warp and fill and strand sizing or material of construction may be practiced without departing from the scope of the invention.

U-shaped channel members 22, 23 and 24 are located along three outer edges of upper filter element 18 and lower filter element 19. Channel members 22, 23 and 24 maintain the three edges of filter elements 18 and 19 in a contiguous configuration within the channel of the U-shaped channel members 22, 23 and 24 along the length of each respective edge. The three edges contiguously joined by channel members 22, 23 and 24 along the length of each respective edge. The three edges contiguously joined by channel members 22, 23 and 24 in conjunction with the remaining unengaged edges of upper filter element 18 and lower filter element 19 form a pocket into which filter insert 16 is inserted. Channel members 22, 23 and 24 may be permanently attached to upper filter element 18 and lower filter element 19 and may be permanently attached at their points of intersection. Suitable means for attachment include spot welding.

Another U-shaped channel member 25 is pivotally connected to the end of channel member 22 at hinge 42. After insertion of filter insert 16 into the envelope pocket, the nonattached end of channel member 25 is rotated toward the unconnected edge of filter elements 18 and 19 until the nonattached end connects the end of channel member 24, and is releasably attached thereto by spring 30, with the edges of upper filter element 18 and lower filter element 19 maintained within the channel of U-shaped channel member 25. Upon connection of channel member 25 to channel member 24, upper filter element 18 and lower filter element 19 are connected at their outer edges around their entire periphery surrounding filter insert 16. The peripheral edges of upper filter element 18 and lower filter element 19 may be plazma-welded prior to connection of channel members 22, 23, 24, and 25 to prevent tearing or unraveling of the exposed ends.

Apertures 26, 27, and 28 are provided through the center of upper filter element 18, lower filter element 19 and filter insert 16 respectively. Flat collar members 31 and 32 are attached at the upper and lower surfaces of upper filter element 18 to surround the aperture 26. Flat collars 33 and 34 are attached at the upper and lower surfaces of lower filter element 19 to surround the aperture 28. The internal diameter of the collars 31-34 and the apertures 26-28 is sufficient to slidably receive the threaded shaft 35 of a fastener or closure plug 36 having an enlarged diameter head or flange 37.

The threaded shaft 35 of closure plug 36 is inserted upwardly through the collars 31-34 until the flange 37 bears against the lowermost collar 34 and the threaded shaft extend beyond the uppermost collar 31. A cylindrical cap 38 having a threaded longitudinal bore 39 is threadedly received on the threaded shaft 35. The cap 38 is threadedly tightened against the upper collar 31 to compressibly secure the insert 16, upper filter element 18 and lower filter element 19 together. The collars 31-34 are constructed of relatively rigid material and protect upper filter element 18 and lower filter element 19 from damage due to compressive and angular forces resulting from closure of the cap 38.

Thus, the insert 16, upper filter element 18 and lower filter element 19 are effectively clamped between the flange 37 and the bottom of the cap 38. The length of the cap 38 is such that sufficient threads remain at the top of the cap to threadedly receive and removably connect the filter assembly to a delivery tube 14.

A central longitudinal port 40 extends inwardly within the closure plug 36 a distance from the end of the threaded shaft 35 and a plurality of circumferentially spaced transverse ports 41 extend through the shaft in communication with the central port 40. The ports 41 are axially aligned on the closure plug shaft 35 to reside generally between the upper and lower surface of the insert 16. Filter insert 16 is preferrably provided with a multiplicity of voids, which allow free flow of fluids through the insert 16 in vertical and/or lateral direction and *laterally through passages in the insert* through the ports 41 and central port 40. Fluid communication is thus provided between the interior of delivery tube 14 and the exterior of the filter assembly.

The delivery tube 14 and the pump outlet tube 15 may be constructed with one or more flexible sections, and the pump 13 may be so sized such that the filtering apparatus of the present invention may be transported from place to place.

OPERATION

When using the filtering apparatus of the present invention, a filter powder is employed. The filter powder may be comprised of diatomaceous earth or pearlite or chemical mixtures or a combination thereof. As depicted in FIG. 1, the filtering apparatus is located near the container 11 of cooking oil 12 to be filtered and the filter assembly 10 located at or near the bottom of the container 11. Filter powder (not shown) is dispersed in the cooking oil 12. Upon activation of the pump 13, cooking oil 12 is drawn by suction applied by the pump 13 through upper filter element 18 and lower filter element 19, through the relatively more porous filter insert 16 *and the lateral passages therein*, through ports 41 through central port 40 and through delivery tube 14 to the pump 13. The cooking oil 12 may be transmitted back to the container 11, or transmitted to such other destination as is desired, through the pump outlet tube 15.

Particles of filter powder and other particulate matter dispersed within the cooking oil 12 are drawn by the flow path of the cooking oil 12 to the outer surfaces of upper filter element 18 and lower filter element 19. The flow path of the cooking oil 12 in conjunction with the composition of the particulate matter cause the particulate matter to aggregate at the outer surfaces of upper filter element 18 and lower filter element 19. The suction applied to the cooking oil 12 maintains fluidic channels within such aggregation allowing for the continued filtering of cooking oil 12 despite such aggregation.

The relatively rigid yet porous configuration of filter insert 16 provides support to upper filter element 18 and lower filter element 19 while providing fluidic communication with the central port 40.

The flexible mesh upper filter element 18 and lower filter element 19 in conjunction with the supportive yet porous filter insert 16, the suction provided by pump 13, and the filter powder thus provide a filtering assembly which may be practiced without the requirement of disposable filter elements.

From the foregoing it may be seen that the present filter assembly, being constructed of durable materials, may be scraped to remove filter powder and particulate matter accumulated thereon, and may further be scraped during operation without adversely affecting the filtering operation. The present filter assembly may further be cleaned by the application of cleaning fluids without disassembling the filter apparatus. The present filter assembly eliminates shut down time during operation of the filter assembly, and results in substantial savings in cost of filter powder, in the elimination of paper or other disposable filter elements, and in the cost of labor. It has been determined that regular application of commercially available products designed to prevent accumulation of cooking oil and comestibles on cooking utensils effectively prevents the buildup of such materials on the mesh of the filter elements.

The filter elements of the present filter assembly may be easily repaired if damaged by patching, welding or soldering the affected area. Such repair may be accomplished without the necessity of disassembly of the filtering apparatus.

The filter assembly of the present invention may be readily adapted to conform to a variety of existing commercially available filtering assemblies presently using disposable filter medium.

Although a square or rectangular filter assembly is shown in the drawings, the invention may be practiced with any suitable shape or configuration.

While the filter assembly of the present invention is particularly suitable for filtering cooking oils used in deep frying, the filtering apparatus may also be used in filtering other liquids, particularly liquids containing suspended solids.

While this invention has been described fully and completely with special emphasis on a preferred embodiment, it should be understood that within the scope of the appended claims the invention may be practiced otherwise than as specifically described herein.

I claim:

1. In combination with food cooking apparatus employing cooking oil disposed in a container in which food particles and other particulate matter become deposited, a cooking oil filtering apparatus comprising:

a filter assembly disposed in the cooking oil in the container comprising a deformable porous filter insert member of a relatively rigid material containing sufficient voids *and passages* to allow vertical and lateral fluid flow therethrough, said filter insert being removably contained within and surrounded by an upper and a lower stainless steel wire mesh filter element, a peripherally extending fastener releasably securing said filter insert and the wire mesh filter element in an assembled condition, a hollow fitting secured centrally of one of said wire mesh filter elements having fluid passageways in communication *with lateral passages in* said filter insert, suction means operatively connected to said hollow fitting for drawing cooking oil from said container through said wire mesh filter elements and thence through said filter insert to filter the cooking oil, fluid transmission means operatively connected to said suction means for transmitting the filtered cooking oil to a desired destination, and coagulating means disbursed in the cooking oil for providing filter cake directly on the outer surface of said wire mesh filter elements.

2. The combination according to claim 1 in which said releasable fastener comprises a substantially rectangular frame securing said filter insert and said wire mesh filter members therebetween, one portion of said frame being releasably secured and operable on release to pivot to an open position permitting removal of said plate.

3. The combination according to claim 2 wherein said upper and lower wire mesh filter elements are formed of 24×110 stainless steel wire mesh with 0.0145 inch and 0.0090 strand diameters respectively.

4. The combination according to claim 2 wherein said upper and lower wire mesh filter elements are formed of 80×70 stainless steel wire mesh with strand diameter of 0.0055 inches.

5. The combination according to claim 2 wherein said upper and lower wire mesh filter elements are formed of 100 stainless steel wire mesh with strand diameter of 0.0045 inches.

6. The combination according to claim 2 wherein said interior filter member is comprised of aluminum plate.

7. The combination according to claim 2 wherein said coagulating means is comprised of diatomaceous earth.

8. In combination with food cooking apparatus employing cooking oil disposed in a container in which food particles and other particulate matter become deposited, a cooking oil filtering apparatus comprising:

a filter assembly disposed in the cooking oil in the container comprising a substantially rectangular channel-shaped frame, one portion of said frame being releasable secured and operable on release to pivot to an open position, a pair of wire mesh filter members secured at their peripheries in said channel-shaped frame, a deformable porous interior filter insert member of a relatively rigid material removably positioned between said wire mesh filter members and containing sufficient voids *and passages* to allow vertical and lateral fluid flow therethrough, hollow washer members secured centrally of each of said wire mesh filter members, a hollow washer member secured centrally of said filter insert, said washer members being aligned [when] *with* said filter insert washer members [with its washer member] abutting [the washer member of one of] said [were] *wire* mesh filter members, said hollow fitting having an opening positioned inside said filter insert *and communicating with said lateral passages therein* and having an opening at its end outside said filter assembly, suction means operatively connected to the outside opening of said fitting for drawing cooking oil from said container through said wire mesh filter elements and thence through said filter insert to filter the cooking oil, fluid transmission means operatively connected to said suction means for transmitting the filtered cooking oil to a desired destination, and coagulating means disbursed in the cooking oil for providing filter cake directly on the outer surface of said wire mesh filter elements.

*9. The combination according to claim 1 in which*

*said filter insert comprises a flat rectangular metal plate slitted and the material deformed to form interrupted tubular openings in edge view, said tubular openings providing said lateral passages,*

*said peripherally extending releasable fastener comprises a substantially rectangular frame securing said filter insert plate and said wire mesh filter members therebetween, and*

*one portion of said frame being releasably secured and operable on release to pivot to an open position permitting removal of said plate.*

* * * * *